Patented Nov. 29, 1949

2,489,382

UNITED STATES PATENT OFFICE 2,489,382

CELLULOSE ESTERIFICATION

Mervin E. Martin and Troy M. Andrews, Cumberland, Md., assignors to Celanese Corporation of America, a corporation of Delaware No Drawing. Application March 2, 1945, Serial No. 580,722

7 Claims. (Cl. 260—227)

This invention relates to the preparation of improved organic acid esters of cellulose, and relates more particularly to the production of cellulose propionate and cellulose butyrate of improved molding properties.

An object of this invention is to provide an improved process for the production of organic acid esters of cellulose having three to four carbon atoms in the acid radical.

Another object of this invention is the provision of a process for the production of cellulose propionate and cellulose butyrate wherein said cellulose esters are precipitated in such physical form that they may readily be washed and stabilized.

Other objects of this invention will appear from the following detailed description.

In processes for the production of cellulose propionate, for example, by a process involving the esterification of cellulose with an esterification mixture comprising, for example, propionic acid, propionic acid anhydride and an esterification catalyst, such as sulfuric acid, the conditions of esterification must be carefully controlled. Careful control is necessary so that gelation of the esterification mixture is avoided, which gelation renders the precipitation of the cellulose propionate difficult or even impossible. Equally as important, however, is control of the conditions of esterification so that the precipitation of the cellulose propionate from the esterification reaction mixture will result in the formation of the type of precipitate which may be readily washed and stabilized. In the usual processes for the production of cellulose propionate, the precipitated cellulose propionate is normally quite hard and impervious and not of the desired fibrous form. This hard type of precipitate cannot be washed very rapidly to remove the acid catalyst which may be held therein and, consequently, even though subjected to a stabilization treatment, does not yield a product of a satisfactory degree of stability. It has been suggested that an improved type of cellulose propionate precipitate, e. g. one which is substantially fibrous and which may be washed neutral and stabilized satisfactorily, may be obtained if a substantial quantity of acetic acid is added to the fully ripened solution of cellulose propionate just prior to precipitation and the cellulose propionate is precipitated therefrom by diluting the solution with water or dilute acetic acid. This method of producing a suitably fibrous precipitate is disadvantageous, however, since it necessitates the formation of dilute solutions of mixed acids which must not only be concentrated for re-use but separated as well, if the process is to prove to be at all economical.

We have now discovered that cellulose propionate and cellulose butyrate of improved color, stability, molding, dielectric and other physical properties may be obtained by a novel esterification process which enables the desired type of fibrous precipitate to be formed without the disadvantages of the esterification processes heretofore employed and, furthermore, without any danger of forming undesirable gels. In accordance with our novel process, said improved cellulose esters may be obtained by esterifying cellulose with an esterification mixture comprising an aliphatic acid of three to four carbon atoms, such as propionic acid, the corresponding aliphatic acid anhydride such as propionic anhydride and a suitable esterification catalyst, diluting the solution of cellulose ester obtained by the addition thereto of propionic or butyric acid, depending on the cellulose ester being produced, substantially at the completion of esterification but prior to any ripening, said addition being an excess over the amount of acid necessary to effect the desired esterification, the latter amount already being present, and then rapidly ripening the cellulose ester obtained in solution, to the desired degree, at elevated temperature. Our novel process, involving the addition of an additional quantity of the acid employed during the esterifying process to the esterification solution when esterification is substantially completed, not only permits the production of fully esterified cellulose propionate or cellulose butyrate but, on ripening the cellulose esters to the desired acyl value followed by precipitation, our novel process yields a fibrous type of cellulose propionate or cellulose butyrate precipitate which is easily washed neutral and stabilized. Since our process eliminates the usual dilution with acetic acid and only propionic acid or butyric acid is present in the dilute acid obtained at the completion of esterification, ripening and precipitation, the recovery and concentration of the dilute acid obtained for recycling in the process, becomes greatly simplified and renders our novel process far more efficient and economical.

Thus, in the preparation of cellulose propionate, for example, in accordance with our improved process, the esterification of the cellulose is effected employing an esterifying medium comprising 3 to 6 parts by weight, on the cellulose, of priopionic anhydride, 0.2 to 1.0 part by weight of propionic acid and 0.01 to 0.09 part by weight of an esterfication catalyst such as, for example, sulfuric acid. Usually, the cellulose is subjected to a pretreatment prior to esterification to render it more reactive. The pretreatment preferably comprises spraying a mixture of from 0.20 to 1.0 part by weight of propionic acid, 0.05 to 0.20 part by weight of formic acid and 0.002 to 0.04 part by weight of sulfuric acid on to the cellulose at about room temperature, e. g. 20 to 30° C. then tumbling the mixture for from 1 to 3 hours to ensure thorough mixing. After a thorough mixing has been obtained, the pretreatment is allowed to continue for 5 to 25 hours without further tumbling. The entire amount of propionic acid present during esterification is preferably added to the cellulose during the pretreatment, so that the esterifying medium in the reactor into which the pretreated cellulose is charged will usually contain only the necessary amount of propionic anhydride and catalyst to effect the desired esterification.

The pretreated and activated cellulose is then charged into a suitable reactor containing the appropriate amount of propionic anhydride, propionic acid, if any acid in addition to that added during pretreatment is to be employed, and sulfuric acid catalyst to effect esterification. The esterification mixture of propionic anhydride and sulfuric acid is preferably cooled to a temperature of −12 to 5° C. prior to charging the pretreated cellulose therein so that the temperature, after charging, will not rise above a temperature of about 3 to 15° C. due to the heat evolved by the initial, exothermic esterification reaction. The temperature is permitted to rise, as esterification proceeds, with the maximum temperature being held to about 20 to 38° C. by suitable cooling means. After esterification has proceeded nearly to completion, i. e. from 2.75 to 2.95 propionyl groups having been added, usually over the course of 2 to 8 hours, the propionic acid addition is made.

The addition of propionic acid at this point is preferably made in an amount of from 1 to 5 parts by weight based on the weight of the cellulose esterified. The reaction mixture is agitated during the propionic acid addition. After the addition of the acid is completed, esterification is allowed to continue for another 1 to 4 hours or until the reaction mixture is clear and substantially free of fibers. At this point, the excess propionic anhydride is destroyed by the addition of a suitable quantity of water thereto, from 0.15 to 1.0 part by weight of water for ripening are added and the cellulose propionate is ripened at an elevated temperature of 30 to 100° C. for ½ to 40 hours to obtain a cellulose propionate of the desired free hydroxyl content. After the desired ripening is completed, the sulfuric acid catalyst remaining is neutralized by the addition of magnesium acetate or other suitable basic neutralizing agent to the reaction mixture. The cellulose propionate is then precipitated from solution by the addition of excess water thereto, yielding an excellent fibrous type of precipitate in contrast to the hard and impervious type of precipitate usually obtained. The fibrous cellulose propionate precipitate obtained may then be washed, stabilized and dried without difficulty and yields excellent molded products of high clarity as well as other substantially improved properties.

The cellulosic materials esterified in accordance with our invention may be any suitable form of cellulose or cellulose derivative. It may be cotton, cotton linters, wood pulp, regenerated cellulose, or other cellulosic materials obtainable from various other sources, such as grasses, straws, hulls, waste materials, such as bagasse, and the like.

In order further to illustrate our invention but without being limited thereto, the following example is given:

*Example*

20 parts by weight of cellulose are pretreated by spraying the cellulose with a mixture comprising 6 parts by weight of propionic acid, 2.2 parts by weight of formic acid and 0.11 part by weight of sulfuric acid, tumbling the mixture obtained to ensure thorough mixing and then allowing the treated cellulose to stand for 15.5 hours at 24° C. to activate the cellulose to the desired degree. The pretreated cellulose is then esterified by being added to an esterification mixture comprising 80 parts by weight of propionic acid anhydride and 0.33 part by weight of sulfuric acid cooled to −12° C. The temperature rises to 9° C. at the start of the esterification and is permitted to reach a peak temperature of 29° C. after 185 minutes. The esterification is permitted to continue for a total of 370 minutes. At this point, 63 parts by weight of propionic acid are added with stirring. This addition of propionic acid represents an excess over the amount of propionic acid normally required to effect the desired degree of esterification. The amount required for esterification is already present prior to the addition of the excess acid. The esterification is continued following the propionic acid addition until the reaction mixture clears. The solution clears about 180 minutes after the propionic acid addition is made, making the total esterification time about 550 minutes. At the completion of esterification, 4 parts of water are added. The temperature rises from 28 to 44.5° C. following this water addition and a further 1.5 parts of water are then added, the water additions being made gradually over the course of 30 minutes. After this initial water addition which destroys the propionic acid anhydride, 8 parts of water for ripening are added. The temperature of the solution is then raised rapidly to 60° C. and ripening is conducted at this temperature for 5 hours. After ripening to the desired free hydroxyl content, the cellulose propionate is precipitated from solution by the addition of an excess of water thereto. A cellulose propionate containing about 60% combined propionic acid is obtained. The precipitated cellulose propionate is obtained in a loose fibrous form and may be readily washed free of acid by suitable washing operations. The cellulose propionate obtained after washing and drying is of excellent stability and may be molded at temperatures of about 200° C. for 15 minutes with or without a plasticizer, such as, for example, dibutyl phthalate and yields molded articles of excellent clarity and color and with relatively little decomposition as shown by the limited viscosity loss produced by molding. The cellulose propionate produced by our novel process also exhibits improved dielectric properties.

While our invention has been more particularly described in connection with the preparation of cellulose propionate capable of being precipitated in a loose and easily washed fibrous form, it is to be understood that by suitable modification of our novel esterification process, other higher organic esters of cellulose, such as, for example, improved cellulose butyrate, may also be prepared.

It is to be understood that the foregoing detailed description is given merely by way of illustration and that many variations may be made therein without departing from the spirit of our invention.

Having described our invention, what we desire to secure by Letters Patent is:

1. Process for the production of cellulose propionate of improved physical properties, which comprises esterifying cellulose with an esterification mixture comprising propionic acid in an amount sufficient to effect the esterification, propionic acid anhydride and an esterification catalyst, adding to the reaction mixture just before the completion of esterification, and when the cellulose propionate contains from 2.75 to 2.95 propionyl groups, more propionic acid in an amount at least equal to that originally employed for the esterification of the cellulose, continuing the esterification until the reaction mixture is substantially clear, precipitating the cellulose propionate from solution in fibrous form and washing it free of acid.

2. Process for the production of cellulose propionate of improved physical properties, which comprises esterifying cellulose with an esterification mixture comprising 0.2 to 1.0 part by weight, on the cellulose, of propionic acid, 3 to 6 parts by weight of propionic acid anhydride, and an esterification catalyst, adding to the reaction mixture just before the completion of esterification, and when the cellulose propionate contains from 2.75 to 2.95 propionyl groups, more propionic acid in an amount at least equal to that originally employed for the esterification of the cellulose, continuing the esterification until the reaction mixture is substantially clear, ripening the cellulose propionate in solution to the desired free hydroxyl content, precipitating the ripened cellulose propionate from solution in fibrous form and washing it free of acid.

3. Process for the production of cellulose propionate of improved physical properties, which comprises esterifying cellulose with an esterification mixture comprising 0.2 to 1.0 part by weight, on the cellulose, of propionic acid, 3 to 6 parts by weight of propionic acid anhydride and an esterification catalyst, adding from 1 to 5 parts by weight of propionic acid to the reaction mixture just before the completion of esterification, and when the cellulose propionate contains from 2.75 to 2.95 propionyl groups, continuing the esterification until the reaction mixture is substantially clear, ripening the cellulose propionate in solution to the desired free hydroxyl content, precipitating the ripened cellulose propionate from solution in fibrous form and washing it free of acid.

4. Process for the production of cellulose propionate of improved physical properties, which comprises esterifying cellulose with an esterification mixture comprising 0.2 to 1.0 part by weight, on the cellulose, of propionic acid, 3 to 6 parts by weight of propionic acid hydride and sulfuric acid as esterification catalyst, adding from 1 to 5 parts by weight of propionic acid to the reaction mixture just before the completion of esterification, and when the cellulose propionate contains from 2.75 to 2.95 propionyl groups, continuing the esterification until the reaction mixture is substantially clear, ripening the cellulose propionate in solution to the desired free hydroxyl content, precipitating the ripened cellulose propionate from solution in fibrous form and washing it free of acid.

5. Process for the production of cellulose propionate of improved physical properties, which comprises esterifying cellulose with an esterification mixture comprising 0.2 to 1.0 part by weight, on the cellulose, of propionic acid, 3 to 6 parts by weight of propionic acid anhydride and sulfuric acid as esterification catalyst, adding from 1 to 5 parts by weight of propionic acid to the reaction mixture just before the completion of esterification, and when the cellulose propionate contains from 2.75 to 2.95 propionyl groups, continuing the esterification until the reaction mixture is substantially clear, ripening the cellulose propionate in solution to the desired free hydroxyl content at an elevated temperature, precipitating the ripened cellulose propionate from solution in fibrous form and washing it free of acid.

6. Process for the production of cellulose propionate of improved physical properties, which comprises esterifying cellulose with an esterification mixture comprising 0.2 to 1.0 part by weight, on the cellulose, of propionic acid, 3 to 6 parts by weight of propionic acid anhydride and sulfuric acid as esterification catalyst, adding from 1 to 5 parts by weight of propionic acid to the reaction mixture just before the completion of esterification, and when the cellulose propionate contains from 2.75 to 2.95 propionyl groups, continuing the esterification until the reaction mixture is substantially clear, ripening the cellulose propionate in solution to the desired free hydroxyl content at an elevated temperature of 30 to 100° C., precipitating the ripened cellulose propionate from solution in fibrous form and washing it free of acid.

7. Process for the production of cellulose propionate of improved physical properties which comprises esterifying cellulose with an esterification mixture comprising 0.2 to 1.0 part by weight, on the cellulose, of propionic acid, 3 to 6 parts by weight of propionic acid anhydride and 0.01 to 0.09 part by weight of sulfuric acid as esterification catalyst, adding from 1 to 5 parts by weight of propionic acid to the reaction mixture just before the completion of esterification, and when the cellulose propionate contains from 2.75 to 2.95 propionyl groups, continuing the esterification until the reaction mixture is substantially clear, ripening the cellulose propionate in solution to the desired free hydroxyl content at an elevated temperature of 30 to 100° C., precipitating the ripened cellulose propionate from solution in fibrous form and washing it free of acid.

MERVIN E. MARTIN.
TROY M. ANDREWS.

REFERENCES CITED

The following references are of record in the file of this patent:

UNITED STATES PATENTS

| Number | Name | Date |
|---|---|---|
| 2,076,181 | Hopkinson et al. | Apr. 6, 1937 |
| 2,076,555 | Fothergill | Apr. 13, 1937 |
| 2,372,565 | Fothergill | Mar. 27, 1945 |

Certificate of Correction

Patent No. 2,489,382                                November 29, 1949

MERVIN E. MARTIN ET AL.

It is hereby certified that error appears in the printed specification of the above numbered patent requiring correction as follows:

Column 5, line 68, for "hydride" read *anhydride*;

and that the said Letters Patent should be read with this correction therein that the same may conform to the record of the case in the Patent Office.

Signed and sealed this 2nd day of May, A. D. 1950.

[SEAL]

THOMAS F. MURPHY,
*Assistant Commissioner of Patents.*